(12) United States Patent
Clive-Smith

(10) Patent No.: US 7,186,065 B2
(45) Date of Patent: Mar. 6, 2007

(54) VEHICLE SUPPORT FRAME

(76) Inventor: Martin Clive-Smith, Wootton Paddox, Leek Wootton, Warwickshire (GB)

( * ) Notice: Subject to any disclaimer, the term of this patent is extended or adjusted under 35 U.S.C. 154(b) by 0 days.

(21) Appl. No.: 11/320,451

(22) Filed: Dec. 28, 2005

(65) Prior Publication Data

US 2006/0153656 A1  Jul. 13, 2006

Related U.S. Application Data

(63) Continuation of application No. PCT/GB01/04413, filed on Oct. 3, 2001, and a continuation of application No. 10/398,068, filed on Sep. 8, 2003, now Pat. No. 7,025,546.

(30) Foreign Application Priority Data

Mar. 10, 2000  (GB) ................. 0024214.9

(51) Int. Cl.
*B60P 3/08* (2006.01)

(52) U.S. Cl. .................................... 410/24

(58) Field of Classification Search ........... 410/3–4, 410/7–8, 13–18, 24, 26–27, 29, 29.1; 206/503, 206/509; 220/1.5, 4.26, 4.27; 414/400, 414/399, 342, 347

See application file for complete search history.

(56) References Cited

U.S. PATENT DOCUMENTS

| | | | | | |
|---|---|---|---|---|---|
| 2,128,376 | A | * | 8/1938 | Nampa et al. | 410/15 |
| 2,261,455 | A | * | 11/1941 | Walker et al. | 410/15 |
| 2,959,262 | A | * | 11/1960 | Parker et al. | 410/27 |
| 3,023,711 | A | * | 3/1962 | Rolfe, Jr. | 410/15 |
| 3,043,454 | A | * | 7/1962 | Butler et al. | 410/26 |
| 4,801,229 | A | * | 1/1989 | Hanada et al. | 410/26 |
| 5,775,858 | A | * | 7/1998 | Bacon | 410/26 |

* cited by examiner

*Primary Examiner*—H Gutman
(74) *Attorney, Agent, or Firm*—Donald N. MacIntosh

(57) ABSTRACT

A vehicle support, for a container comprises a frame suspended from one or more of adjustable span, to vary frame disposition, such as elevation and/or tilt, from an (un) loading to a transport mode; the frame is configured for converting or adapting a standard container, and a self-contained retractable version incorporated in a demountable container extension module is envisaged.

3 Claims, 8 Drawing Sheets

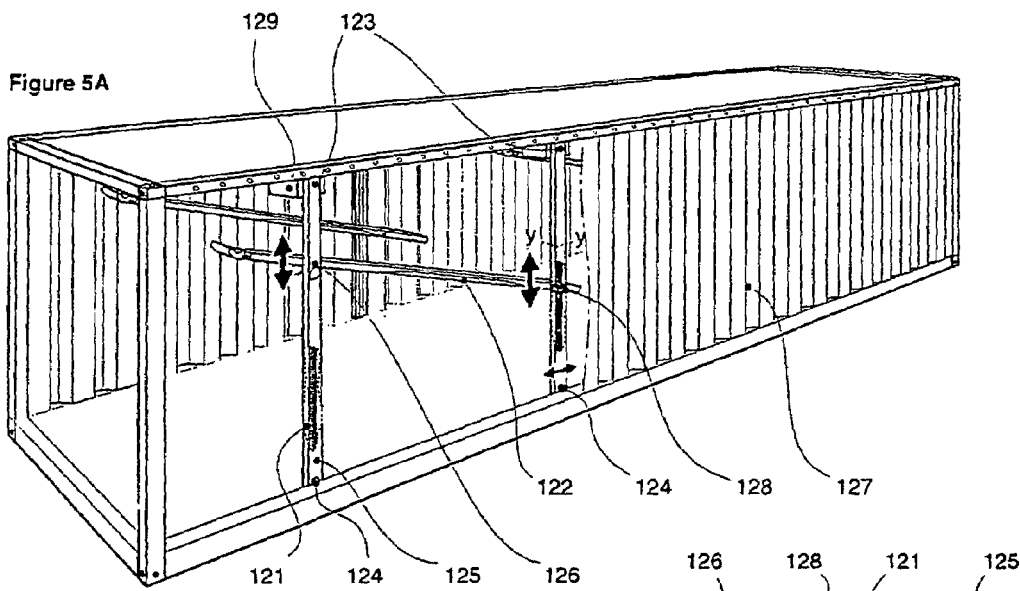
Figure 5A
Figure 5B
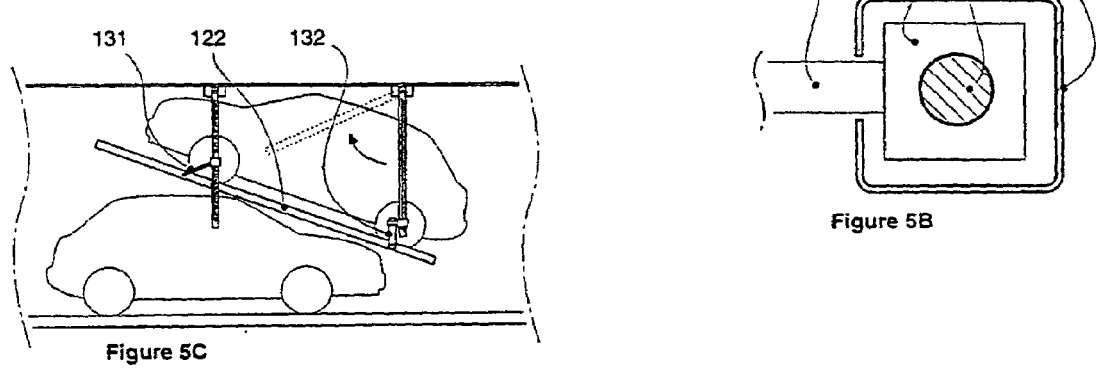
Figure 5C
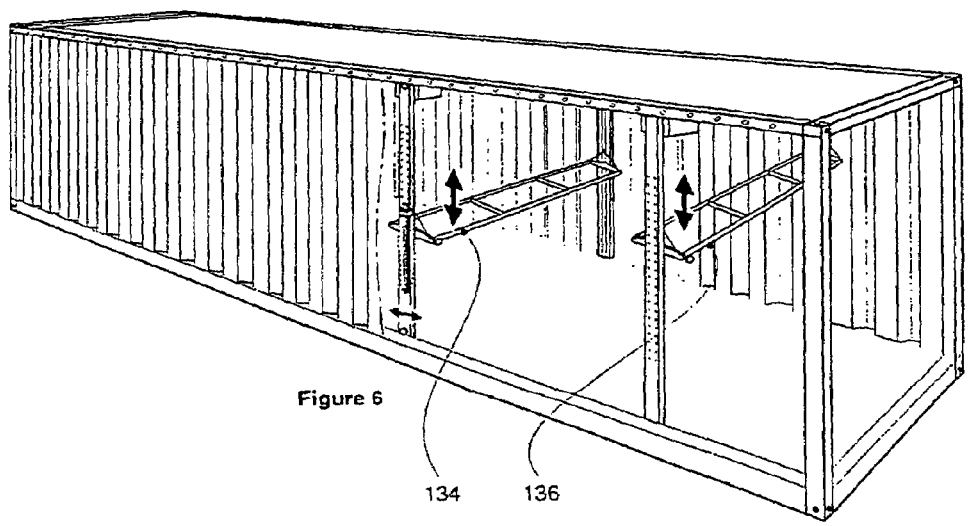
Figure 6

VEHICLE SUPPORT FRAME

CROSS-REFERENCE TO RELATED APPLICATIONS

This is a continuation of prior PCT application No. PCT/GB01/04413, filed 3 Oct. 2001. It is also a continuation of prior U.S. application Ser. No. 10/398,068 filed 8 Sep. 2003 now U.S. Pat. No. 7,025,546.

BACKGROUND OF THE INVENTION

1. Field of the Invention

As an established standardized freight handling format, containerization has been proposed for vehicle transport and storage, for load handling convenience, security and protection.

The term vehicle, is primarily directed to motor cars, but in principle embraces other types such as vans, trucks, tractors and trailers, with or without on board cargo. For economic considerations of optimal utilization, cargo load configuration is carefully matched, to occupy the full internal container volume, allowing for some load handling and access clearance.

As to load capacity, containers are generally of standardised elongate rectangular form, in both plan, side and end elevation, to certain dimensions. This rectangular form does not readily lend itself to accommodate diverse curved vehicle profiles, without significant wasted space around vehicles.

Vehicles must be restrained and buffered, to inhibit inadvertent contact with the container structure, or other vehicles and consequent impact and abrasion damage to vulnerable body panels, in container (un)loading, handling and transit.

2. Description of Related Art

Already, some tens of thousands of vehicles (annually) are transported in containers. However, even though vehicle containerisation has been known and adopted for decades, important needs and considerations have not been met. Nevertheless, the challenge remains of using more of the millions of containers available worldwide. Moreover, millions of cars are presently shipped exposed, which could travel in containers.

Proposals have been made for containers with bespoke vehicle restraint, mounting or even mutual stacking frames. These have commonly included somewhat bulky intrusive, inflexible structures restricting volumetric capacity and payload. Vehicle stacking has hitherto adopted a simple tiered approach, requiring the combined height of vehicles to fit within a limited container height or depth. Moreover, the frames have limited the density, juxtaposition or proximity of vehicle packing and, by their inflexible form, have generally precluded a snug mutual profile interfit. As such, they are not intended or suitable for conversion of existing containers.

Practical issues also arise in (un)loading and accommodating operator access to and from vehicles once within container confines. Standard containers tend to be either 8' 6" high or 9' 6" high (externally). Their internal access apertures, through (end) door entrance frame are typically some 12 inches less; half taken up by the load bearing base, and half by a structured door header, located only at the door positions. Thus, problems have been encountered with maneuvering cars safely inside a container and fixing them securely in place. This has proved laborious and time consuming—reflecting the need to work in a confined area around a supporting framework to hold cars in place.

Typically there are two existing approaches to vehicle containerisation. In one approach, a vehicle is driven into a container and then a ramp framework assembled over it. The ramp is inclined at a relatively steep angle. A second vehicle is then driven up the inclined ramp—where it is lashed in situ. In practice, in order to lash an upper vehicle in place, an operator has to lean over an underlying bottom vehicle and framework. Thus, damage to the bottom car is a regular occurrence—making this approach unpopular. For a less steep ramp angle, greater ramp length, or span, for a given height is required. Thus, part of the ramp is temporarily extended beyond its shipping position. The ramp extension is then removed and a third car driven into the container along the floor and lashed in place. Another ramp is then assembled over it and a fourth car driven 'precariously' up the ramp and lashed in place. This is time-consuming and hazardous. Furthermore, the ramp extension now protrudes from the container end—possibly needing special support when in use.

The second common approach overcomes certain disadvantages of the first, by assembling vehicles, one above another upon a double-decked cassette. It is also known to assemble a vehicle support frame outside a container, giving room to work. Once vehicles are in place and lashed, the cargo or load module, or 'cassette' is lifted and pushed inside the container, where it is fastened internally. However, this requires operator skill in maneuvering combined weight of vehicles and cassette frame, typically with a forklift truck.

When discharging in either of these approaches, the cassette, or ramp, framework must be dismantled and/or withdrawn wholesale, before innermost vehicles can be pulled or driven out. Thus, if it is desired to discharge vehicles when the container is being carried say 1.2 meters above ground level—as, say, when carried on a trailer—the (un)loading becomes complicated, protracted and expensive—not least with provision of mechanised lifting devices to move ramp frames or cassettes. If vehicles are to be discharged at a dealer's premises in the centre of a town, such a procedure in the road with industrial fork trucks is impractical.

EP 0808780 Oglio teaches a dedicated container adaptation for vehicles, using an intrusive internal framework with upright side posts with guideways for support cables and locating rollers of a horizontal vehicle support platform. The platform is elevated for vehicle stacking and is of open profile between wheel ramps to allow intrusion of an underlying vehicle bonnet or hood. In practice one vehicle largely or completely overlies another. This assumes combined vehicle heights fit within the container depth—a consideration unlikely for contemporary tall vehicle forms, such as MPV's and 4WD's and family saloons. The framework intrudes significantly upon overall internal load capacity, and is somewhat inflexible in achieving optimum vehicle packing densities, through closer respective profile interfit.

Objective(s)

Ready vehicle (un)loading, without resorting to auxiliary lifting equipment, would be advantageous. Once known vehicle frames and cassettes are no longer needed, they have to be packed into another container for return-to-base and re-use—assuming parts are not lost, as is common, en route.

Retention of vehicle support frames within the same container being used for car transport would be advantageous—provided stowed out of the way of other general cargo. The loading angle of known ramps and cassettes is rather steep, for tight vehicle packing, yet keeping their overall height low enough to fit through the door height on an existing container precludes use of a internal roof head or 'dead' space.

Some means to motorise the ramp, so that the loading angle could be set low or even horizontal, yet once the vehicle is on board the ramp the angle varied, would be advantageous.

Other considerations include: An upper vehicle support frame affects the space available for the lower vehicle. If the support were clear of the bottom vehicle, working space for lashing and vehicle access could be much improved. If the support frame were motorized, energy requirements of existing vehicle carriers could be considered. These would have to lift both vehicle and support frame weight.

Road borne vehicle carriers have a prime mover able to generate considerable power, to satisfy such a need. A shipping container carries no such on-board power generator and, if needed, power would have to be supplied by a much less powerful source, such as batteries of a tractor unit, or manually. Means to reduce power requirements of a motorised frame would be advantageous.

SUMMARY OF THE INVENTION

According to one aspect of the present invention, a vehicle support for a container comprises a frame suspended from one or more elements. Desirably, one or more elements are of adjustable span, to vary frame disposition, such as elevation and/or tilt, from an (un)loading to a transport mode. The (suspended) vehicle support could be used with a disparate variety of container forms, including open sided formats, such as curtain sided and flat racks. Reliance is placed, upon an overlying (roof) structure, rather than side or end walls or intervening frames—although contact could be made with these for bracing and stability of suspended load. In that sense, the support frame could be configured as a form of gantry, even crane.

The vehicle support could be configured for collapse into a compact folded retracted condition. To this end the vehicle support could be fitted with a retractable suspension element. When fully collapsed, the vehicle support could be accommodated in what otherwise would be a container internal head space or dead space, representing the depth of any end frame or header rail under which loads access the container.

In practice, the vehicle support could be platform, or a frame configured as wheel ramps. A vehicle support frame could be configured as a wheel sling, cradle or carriage, for vehicle support. Such cradles could be hung from cables, and/or threaded (screw jack) bars or pillars, again secured to the container roof or top frame structure. Such cable or screw lift mechanisms could also be accommodated within container (structural) frame elements. Adjustable bracing, [longitudinally and/or transversely] could be fitted between frame and container, such as by a screw clamp, with end buffer for location in container side wall corrugations.

A demountable loading ramp could be carried by the vehicle support, and similarly retracted towards and into the roof space. Safety ties could be fitted from the container roof, and the vehicle support frame secured to them in the elevated position, as a backup restraint to the primary lift suspension mechanism.

BRIEF DESCRIPTION OF THE DRAWINGS

There now follows a description of some particular embodiments of vehicle containerization according to the invention, by way of example only, with reference to the accompanying diagrammatic and schematic drawings, being an exposition of various aspects, vis:

FIGS. 1A and 1D are views showing a collapsible vehicle support frame configuration, allowing reversion of a container for general cargo;

FIGS. 1A through 1D are views showing suspension of a collapsible support frame from above, in particular from a container roof; with a compact, collapsed frame mode closely underslung to the roof underside, to allow vehicle (un)loading, substitution, or combination, with general cargo;

FIGS. 1A through 1D and 2A, 3A, 4A, 5A and 7A are views showing an elevated, adjustable, tilt mode of vehicle support, allowing closer juxta positioning and internesting of mutually overlying vehicles;

FIGS. 1A through 1D and 7A through 7D) are views showing a cable slung vehicle support, for vehicle disposition adjustment, with mutually inclined opposed tension bracing runs, for longitudinal FIGS. 2A & 2B are views showing an adjustable buffer, transverse bracing of vehicle support, between opposite side walls, with a profiled buffer nose for location in recesses of corrugated wall profile.

FIGS. 2A, 2B and 7A through 7D are views showing side post location, with opposed longitudinal tension in cable suspension, of vehicle support frame, or wheel carriage; side wall locating buffer also imparts longitudinal restraint.

FIGS. 3A through 3B are views showing retractable bracing strut between one end of vehicle support frame or carriage and container floor, to relieve cable suspension or screw pillar jack loads at other end.

FIGS. 4A and 4B show a curtain-sided adaptation of the vehicle container of FIGS. 1A through 1D.

FIGS. 5A through 5C are views showing the screw jacking pillar adjustable mounting of vehicle support frame.

FIG. 5C are views showing the hanging variant screw pillar variant under tension, so admits of smaller cross-section, convenient for fit within recess of side wall corrugation; traveller with spigot can engage vehicle support frame, or vehicle wheel carriage directly, through, say, pivoted link and/or through cable suspension.

FIGS. 6, and 7A through 7D are views showing a free hung cradle suspension of vehicle wheels, by transverse carriages, cradles or slings, at either or both ends.

Demountable Module for Open Top Container

Vehicle support frame suspended from demountable container module, such as roof extension of open top container variant; allowing collapse folded retracted mode within module profile.

DETAILED DESCRIPTION OF THE INVENTION

Figure 1A:
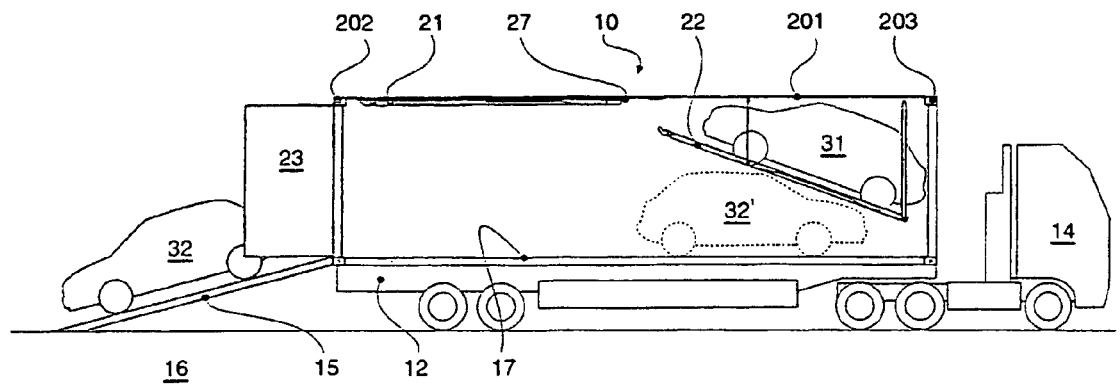
FIGS. 1A through 1D are views showing adaptation or conversion of an otherwise standard container to accommodate vehicles, using an internal support frame.
Figure 1B:
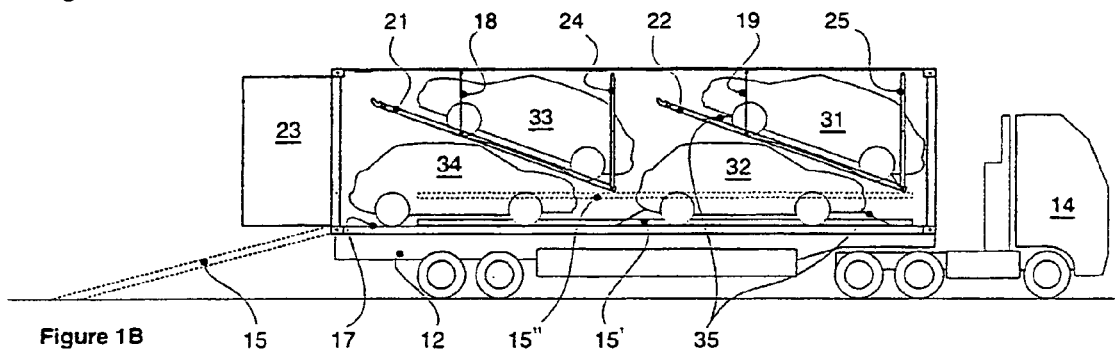

Considering these aspects in relation to the drawings:

FIGS. 1A through 1D show a container adapted for vehicles, and in particular a road trailer mounted container, fitted with retractable, overhead stowable, vehicle support, to allow conversion to a dedicated vehicle mode, or a mixed vehicle and general cargo load; and attendant vehicle (un) loading sequence. Thus, more specifically: FIG. 1A shows a part cut-away side elevation of a container, with a vehicle support frame deployed and another retracted;

FIG. 1B shows the container of FIG. 1A, full to capacity with vehicles, using deployed loading, mounting and support frames, in particular for an upper vehicle layer or row; also depicting loading ramp stowage.

Figure 1C:
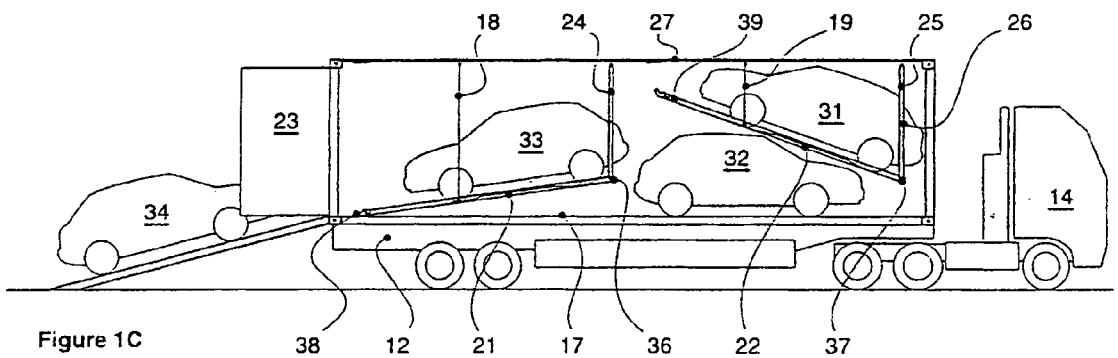
Figure 1D:
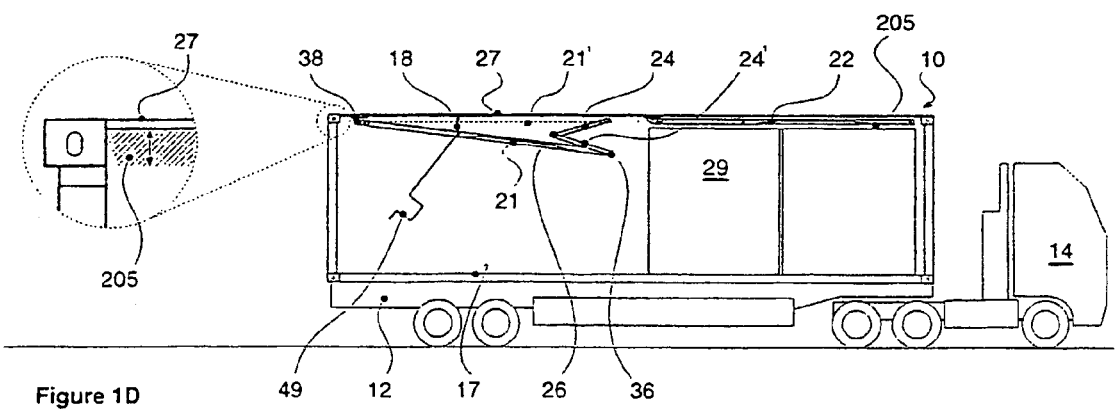

FIG. 1C shows an initial stage in unloading the full container of FIG. 1B, by lowering a rearward vehicle support frame and deploying an inclined (un)loading ramp;

FIG. 1D shows a mixed cargo conversion mode of the container shown in FIGS. 1A through 1C, with a (forward) vehicle support fully retracted from above to overlie a load-volume matched general cargo, and a rearward vehicle support frame partially lowered, in readiness for a vehicle (not shown) to be stowed at an upper level.

Figure 2A:
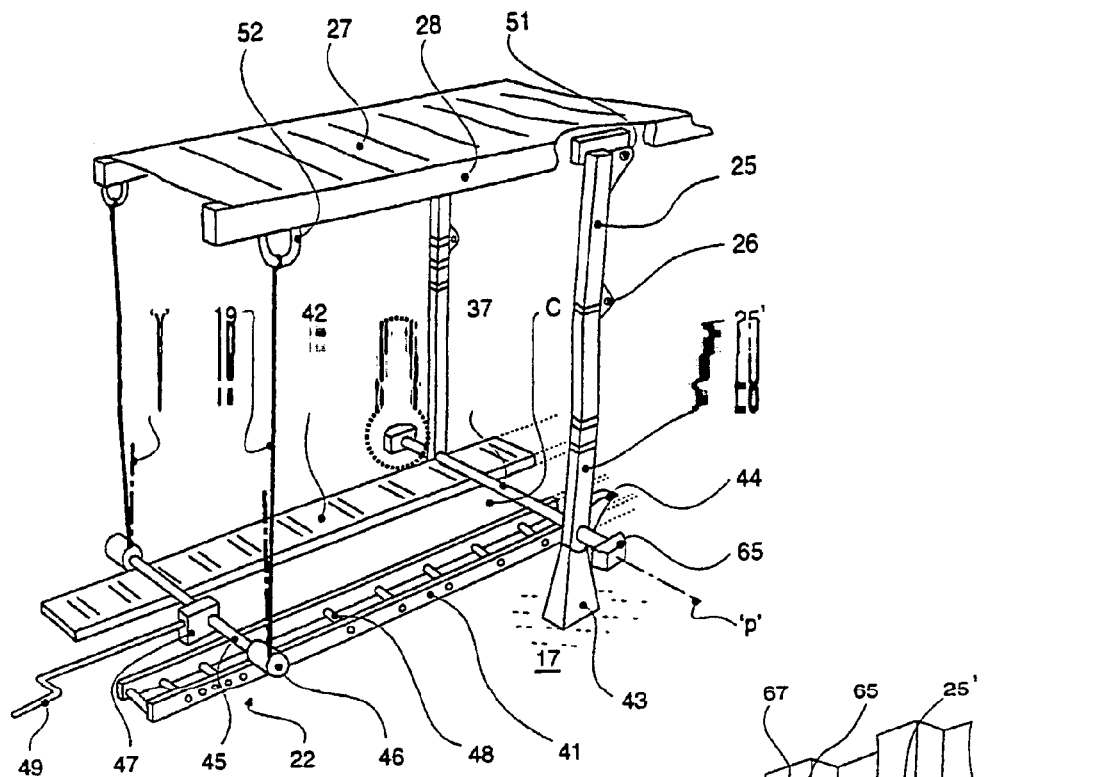
Figure 2B:
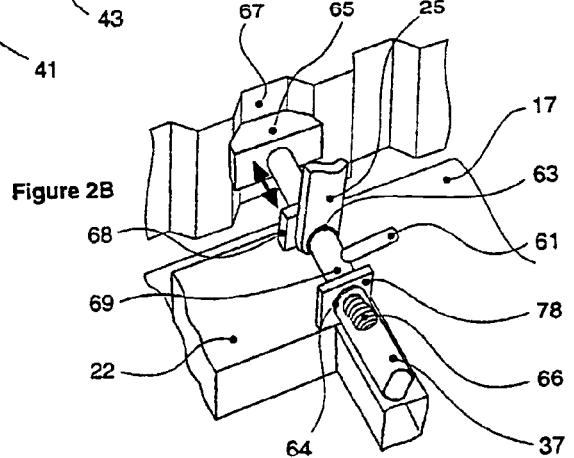
Figure 2C:
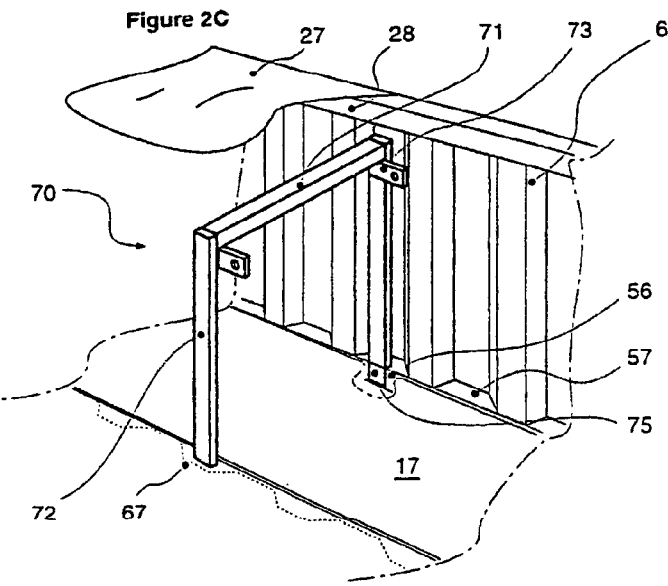
FIGS. 2C and 2D is a view showing accomodation of lateral posts, pillars or struts, or screw jacking pillar, or cable suspension runs for vehicle support frames within side wall panel corrugated profile, to minimise intrusion upon load span capacity.
Figure 2D:
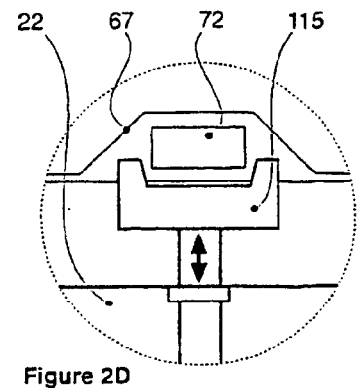

FIGS. 2A through 2C show a vehicle support frame for the containers of FIGS. 1A through 1D. Thus, more specifically: FIG. 2A shows a part cut-away, perspective view of a collapsible, stowable vehicle support frame, with a cable-driven, twin track ramp, and forward pivot bar, with lateral extension provision, to locate and stabilise between opposite container side walls. FIG. 2B shows an enlarged detail of an adjustable buffer, for transverse and longitudinal vehicle support platform bracing between opposed container side walls. FIG. 2C shows recessed location of (slender depth) lateral support posts and header beam for the vehicle support of FIG. 2A. FIG. 2D shows an enlarged detail of a lateral bracing clamp, with a profiled end for the inset side posts of FIG. 2C.

Figure 3A:
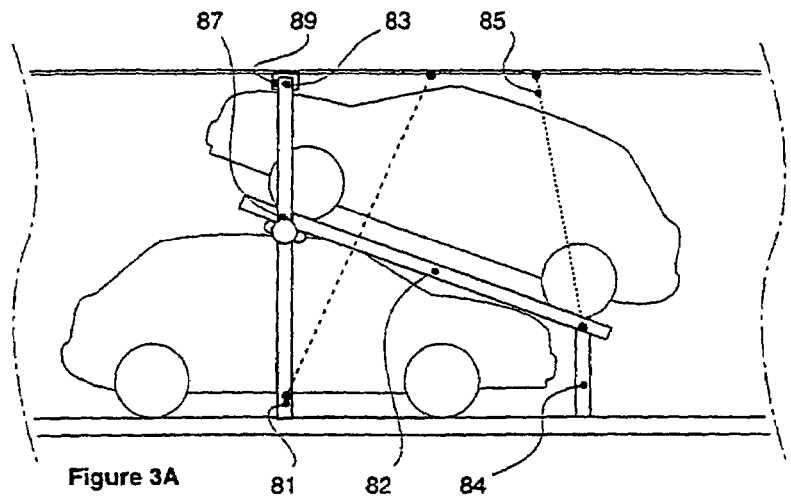
Figure 3B:
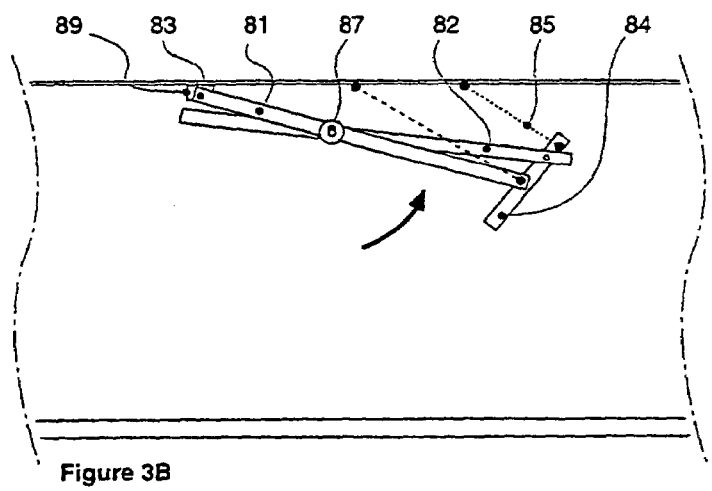
Figure 4A:
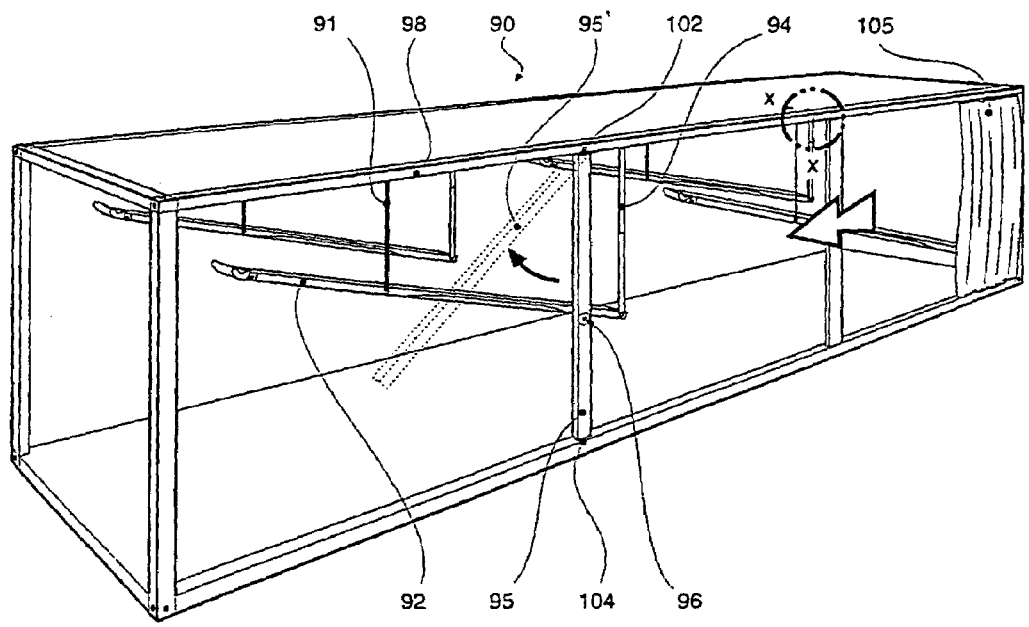
Figure 4B:
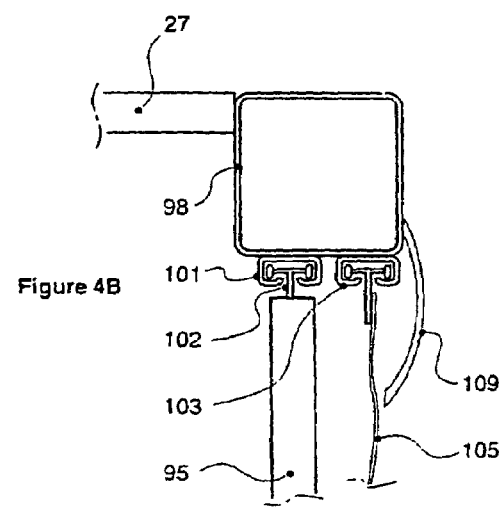

FIGS. 3A and 3B show a vehicle support frame, with supplementary end strut, also compatible with the curtain-sided container variant of FIGS. 4A and 4B. Thus, more specifically: FIG. 3A shows an erected and elevated inclined vehicle support frame, pivotally carried at one end between lateral posts (which may in turn run in guide tracks of a curtain sided container variant) and at the other end by cable drive, but also resting (temporarily) upon a deployed pivoted strut, bearing upon the container floor. FIG. 3B shows the vehicle support frame of FIG. 3A, part-retracted toward the container roof, using a cable suspension and push from below, with the end strut pivoted away from the underlying cargo space.

FIGS. 4A and 4B show a curtain-sided adaptation of the vehicle container of FIGS. 1A through 1D. Thus, more specifically: FIG. 4A shows use of upright, lateral guidance, traveller posts, running between upper and lower curtain rail guides at each container side, to carry, through an intermediate pivot mounting, a vehicle support frame of pair wheel ramps, with a roof mounted cable suspension at one (rearward) end and a depending articulated link at an opposite (forward) end. FIG. 4B shows a larger scale sectional detail of curtain guidance rail post location, of FIG. 4A.

FIGS. 5A through 5C show screw jacking pillar vehicle support frame variants of the curtain-sided container of FIGS. 4A and 4B. Thus, more specifically: FIG. 5A shows use of longitudinally-spaced, curtain rail located traveller posts, for independent adjustable support of opposite vehicle support ramp ends at each container side, allowing ramp tilting and elevation FIG. 5B is an enlarged section of a screw jack pillar disposition within a lateral support post carried between upper and lower curtain side rail guides; a captive screw runner carries an inward ramp location spigot, and FIG. 5C shows a variant screw pillar jack of FIG. 5A, using overhead guide rail suspended elements, with swinging link and cable suspension between respective screw runner and ramp ends; tension loading allowing a smaller screw pillar section, more readily accommodated in side wall corrugation recesses, of FIG. 2C;

FIG. 6 shows a variant of FIGS. 5A and 5B, with vehicle support frame configured as transverse cradles for respective front and rear wheel pairs, and independently movable upon lateral screw jacks carried between guide rails, admitting longitudinal movement with variation in relative wheel carriage elevation.

Figure 7A:
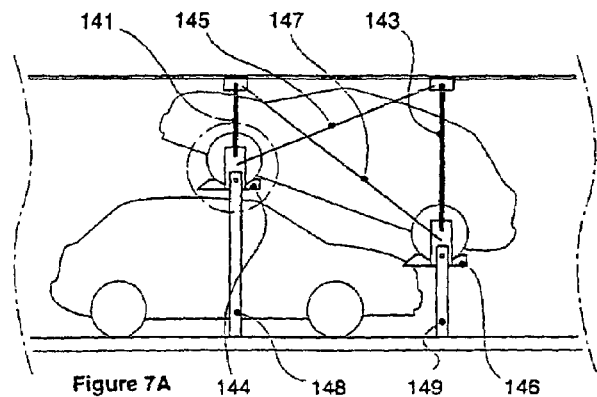
Figure 7B:
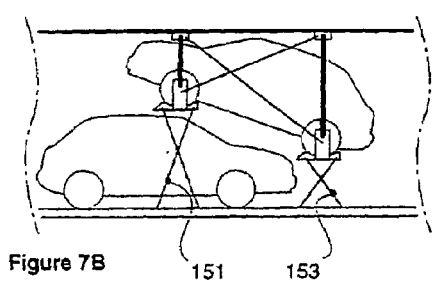
Figure 7C:
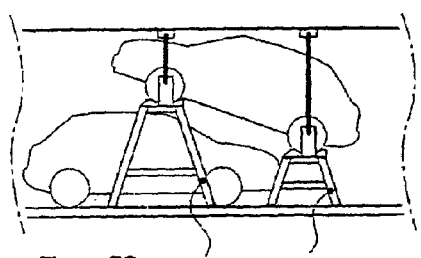
Figure 7D:
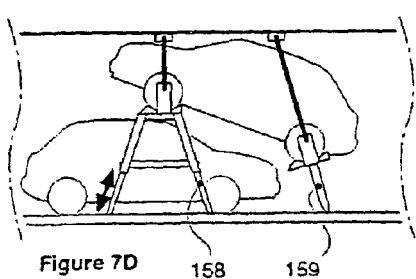
Figure 7E:
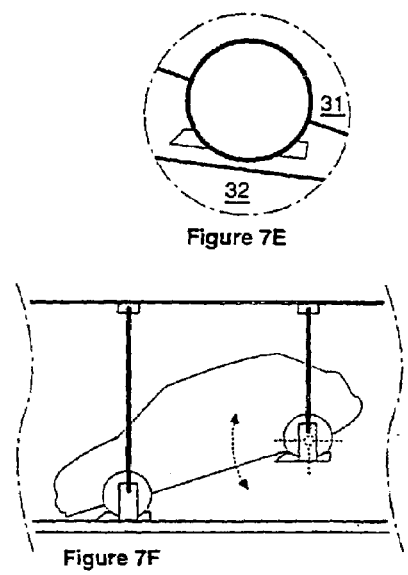
FIG. 7E shows enlarged detail of local vehicle wheel protrusion below a support cradle, as a buffer, against casual impact or abrasion.
Figure 7F:
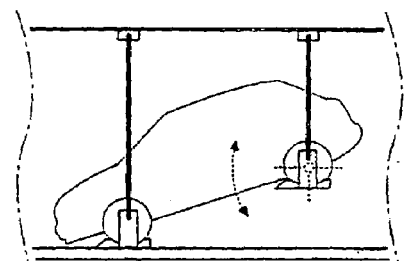
FIG. 7F shows vehicle reorientation and redisposition, about a pivot axis of rear wheel pairs suspended in a transverse cradle.
Figure 7G:
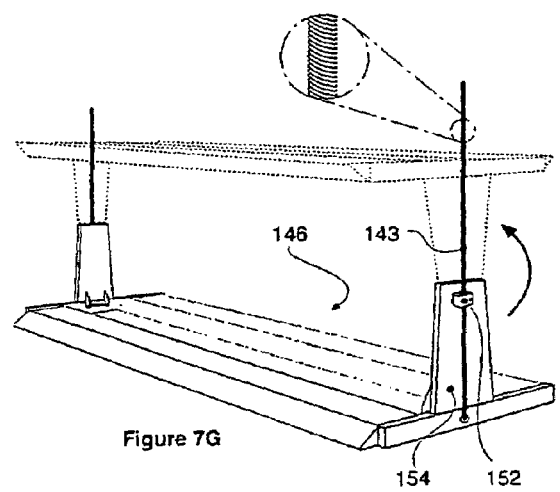
FIG. 7G shows a transverse wheel cradle with suspension cable stabilization upstand and clamp.
Figure 7H:
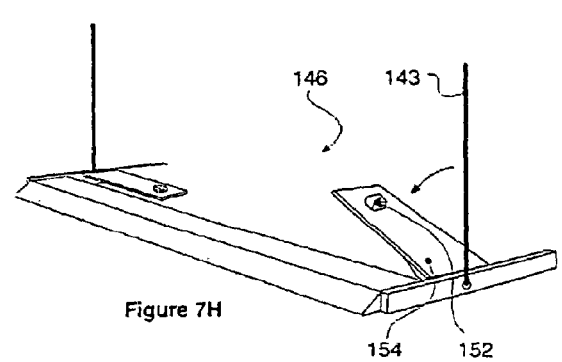
FIG. 7H shows a movable cradle upstand and clamp variant of FIG. 7G.

FIGS. 7A through 7D show cable-suspended wheel cradle variants of FIG. 6, with cross-bracing and underpinning support options. Thus, more specifically: FIG. 7A shows cable suspended wheel cradles, from upper curtain rail guide tracks at each side, and supplementary depending support struts between cradle and container floor, along with opposed diagonal tension wire cross-bracing of suspension cable mounting, for longitudinal and transverse restraint FIG. 7B shows a variation of FIG. 7A with cross-leg adjustable trestles between wheel cradles and container floor. FIG. 7C shows a variant of FIG. 7B with fixed-stance, trestle frames underpinning cable suspended wheel cradles at opposite vehicle sides. FIG. 7D shows a variant of FIG. 7C with adjustable leg, wheel cradle underpinning trestles, at one vehicle end, in a co-operative stance with a pendulum offset disposition of an otherwise freely cable suspended wheel cradle at the other end. FIG. 7E shows enlarged detail of local vehicle wheel tyre protrusion below a support cradle, as a buffer, against casual impact or abrasion with, say, an underlying vehicle. FIG. 7F shows vehicle (re-) orientation and (re-) disposition, about a pivot axis of (rear) wheel pairs suspended in a transverse cradle, such as of FIGS. 7G and 7H. FIG. 7G shows a transverse wheel cradle with suspension cable stabilisation upstand and clamp. FIG. 7H shows a movable cradle upstand and clamp variant of FIG. 7G.

Figure 8A:
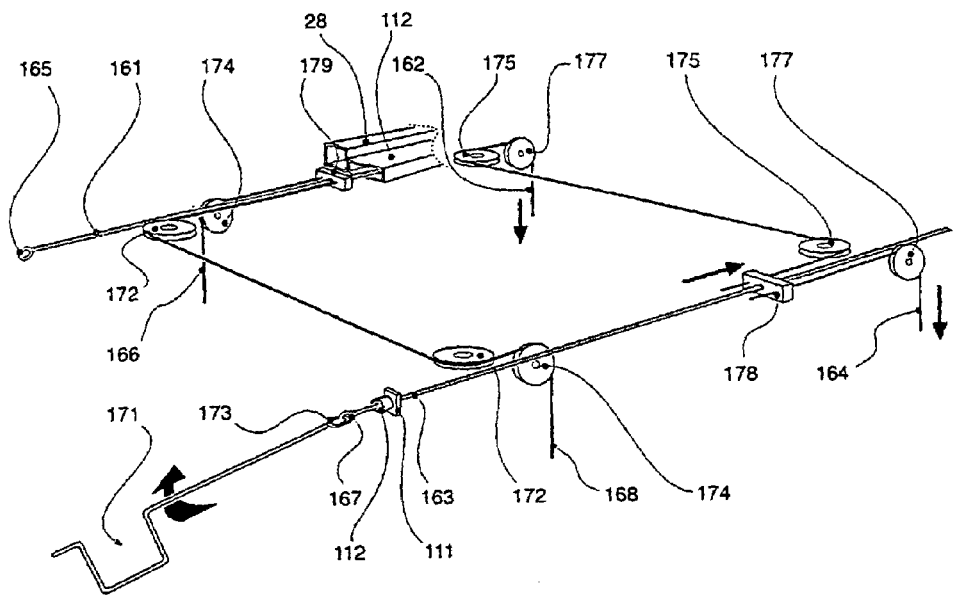
FIG. 8A shows screw drive rotational adjustment, using a selectively coupled turning handle, for one forward vehicle ramp end.
Figure 8B:
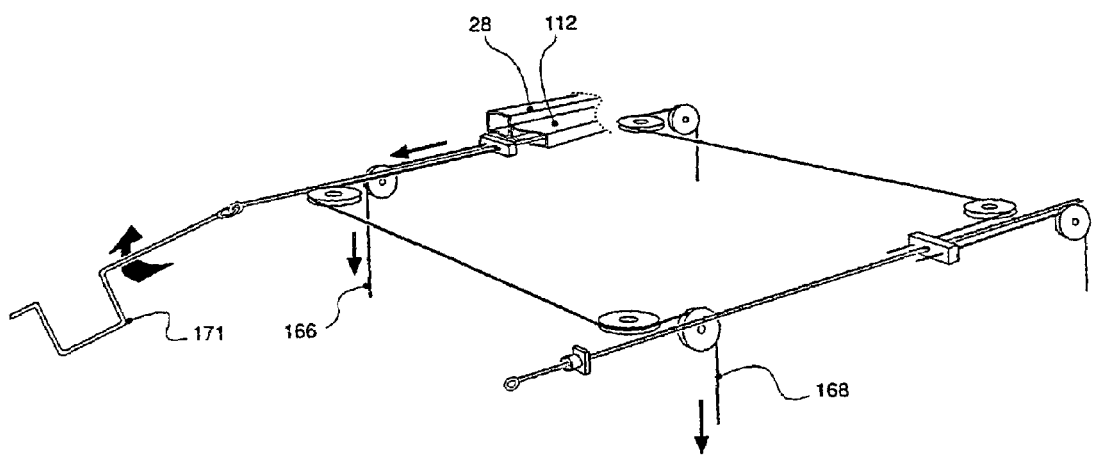
FIG. 8B shows companion screw drive rotational adjustment corresponding to that of FIG. 8A, for an opposite rearward vehicle ramp end.

FIGS. 8A and 8B show an adjustable, cable double-end suspension, for a vehicle support frame—whether wheel cradles or ramps—featuring a cable support run, with pulley guidance, and associated drive screws with traveller blocks; and provision for independent relative end height adjustment, through respective drive screw rotation. Thus, more specifically: FIG. 8A shows screw drive rotational adjustment, using a selectively coupled turning handle, for one (say, forward) vehicle ramp end (not shown). FIG. 8B shows companion screw drive rotational adjustment corresponding to that of FIG. 8A, for an opposite (say, rearward) vehicle ramp end (not shown).

Figure 9:
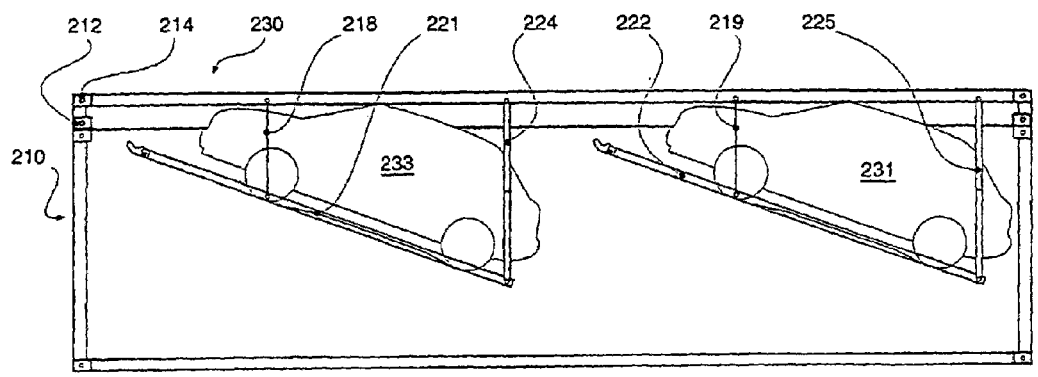
FIG. 9 shows a collapsible vehicle support frame installation within an extension module, fitted upon an open topped container.

FIG. 9 shows a collapsible vehicle support frame installation within an extension module, fitted upon an open topped container.

DESCRIPTION OF THE PREFERRED EMBODIMENTS

Referring to the drawings, a (shipping) container 10 is located upon a road haulage trailer 12, drawn by a detachable tractor unit 14. The container 10 side wall has been cut-away, to reveal internal installations and fittings. Essentially, an otherwise standard container 10 is adapted or converted for vehicle containerisation, by internal provision of collapsible vehicle support frames 21, 22, respectively at rearward and forward container ends. The terms 'rearward' and 'forward' are in relation to the intended transport direction. As such, they apply to vehicle (un)loading direction, whether driven forwards or reversed.

Retractable Suspension

Vehicle support frames 21, 22 are suspended from the container roof 27, comprising a roof panel 201, top side rails 28 and top end rails 202, 203, through elongate suspension elements 19/25, 18/24, at or adjacent each end. Suspension elements 19/25, 18/24 are configured for compact, retractable (collapse) folding, upwards—towards the roof 27 underside. The suspension elements 19/25, 18/24, described later in more detail, are essentially under tension when loaded, and thus can assume slender elongate forms—more compatible with retraction or collapse folding and compact stowage. Thus, in a fully collapsed, upward stowed position, support frames 21, 22 and attendant suspension elements 19/25, 18/24, do not intrude unduly upon the load depth capacity. This allows through passage of either general cargo or vehicles upon a container (platform) floor 17. When deployed, support frames 21, 22 effectively create another, elevated, load tier or layer for elevated vehicle storage, above the container floor 17—by a depth sufficient to accommodate vehicles upon the floor 17, as depicted in FIG. 1B. While two longitudinally spaced frames are depicted—consistent with the capacity of a standard container (some 40 feet) length in relation to (average) target vehicle lengths (some 10–15 feet), in principle a lesser, or even greater, number could be employed for particular vehicle forms. Similarly, while dual layer or level vehicle stacking is depicted, for shallow forms, such as convertibles, additional layers, could be contemplated, with vehicle juxtaposition and (marginal) overlap. Partial frame forms could be employed, allowing selective support of part of a vehicle.

As depicted in FIG. 2A, in a convenient configuration, support frames 21, 22 comprise parallel vehicle wheel ramps 41, 42, suspended together at or towards their opposite ends. Generally, an intermediate suspension and pivot axis may be used to achieve, if not even (see-saw) balance mounting, a desired load-sharing or distribution between fore and aft suspension points. This allows an active lift at one end, about a passive pivot at another end. In this particular example, support frame 21, 22 suspension is through respective: (1) articulated links 24/24', 25/25' at one (forward) end; and (2) a cable suspension 18, 19 at the opposite (rearward) end. In the fully-extended position, the support frames 21, 22 are inclined or tilted, with a lower rearward end.

Vehicles 33, 31 upon frames 21, 22 are tilted forward or backward, according to whether they are loaded backwards or forward, respectively. Vehicles 31–34 generally have a tapering forward end profile and account is taken of this in stacking. Upper deck vehicles 31, 33 are loaded facing backward, to allow their respective shallower nose, canted bonnet and windscreen sections closer to the container roof 27, and reducing the downward intrusion upon the underlying available cargo space. Similarly, the nose, canted bonnet and windscreen sections of underlying forward facing vehicles 32, 34 on the container floor 17 can fit beneath the lower forward ends of overhanging support frames 21, 22. The vehicles 31 through 34 are lashed, say by wheel tension straps and ties 35 (not all shown) to the associated (underlying) support surface or frame.

Resiliently deformable, cushion, buffer or padding elements (not shown) may be positioned between proximate vehicle and container body elements, as a precaution against inadvertent impact or abrasion, upon (un)loading or transit The overhead suspension and pendulous mounting of the support frames 21, 22 allow a certain limited longitudinal and transverse freedom of adjustment. Such adjustment is by manual or motorized operator shift of the links 24, 25 and cables 18, 19—upon which support frames 21, 22 are secured, say, by the lateral side wall locking buffer 65 of FIGS. 2A and 2B, and displaced longitudinally by tensioning (or compressing) adjustable ties 200. Ties 200 comprise, say, webbing straps with ratchet adjustment, anchored to an existing lashing point on the floor 17 at one end and frame 21, 22 at the other. Such adjustment would displace the suspension elements 18/24, 19/25 away from the vertical as shown and (counter) act with them in securing support frames 21, 22.

The container roof 27 may be braced or reinforced locally (not shown), along with hard mounting points for suspension elements 18/24, 19/25. It is envisaged that the support frames 21, 22 could be stiff, light-weight structures, admitting of manual movement, lifting and collapse, with optional ancillary mechanical advantage transmission or power assisted drive, such as through cables or screw jacks.

FIG. 2A shows an example, with both open lattice and platform infill, described later. At a rear end, the container 10 has opposed paired hinged access doors 23. An inclined (un)loading ramp 15, between the open doors 23, bridges between ground level 16 and the rearward edge of the container floor 17.

In FIG. 1A a lower level vehicle 32, in this case a motor car, is depicted reversed, from a parked position 32', out of the container 10, down ramp 15. Above the vehicle 32 rear exit path is a collapse-folded rear vehicle support frame 21, held compact nested close to the underside of a container roof 27 and its infil panel 201.

At the front of the container 10 another vehicle 31, sits upon a deployed (vis extended) tilt-elevated vehicle support frame 22. The support frame 22 is suspended from the roof 27 by articulated rigid links 25 and cables 19 at front and rear ends respectively. With the inclination or tilt of the frame 22, as the vehicle 32 is driven away, it quickly clears from risk of impact with frame 22, or another vehicle 31.

FIG. 1B depicts a full container load—of some four vehicles 31 through 34—stacked at two levels, in forward and rearward pairs. Rearward vehicle support frame 21 has been deployed, so that a vehicle 33 is suspended from the roof 27, with a vehicle 34 located underneath, resting upon the container floor 17.

FIGS. 1C and 1D show a discharge sequence of vehicles 33, 34 from the container 10. A reverse sequence could be used for loading. Thus, initially, a vehicle 34 has been driven away through open end doors 23. Another (upper level)

vehicle 33 is then lowered, by extending cables 18 from the roof 27. The associated vehicle support frame 21 rotates about a (forward) end pivot 36, at its suspension point with articulated link 24—until its opposite (rearward) end 38 contacts the container floor 17. This enables the vehicle 33 to drive off the frame 21, on to the floor 17- and down the ramp 15. Once support frame 21 is unloaded, cables 18 can be (re-)tensioned, (by winches described later), to rotate the frame 21, about pivot 36, until its rearward end 38 contacts the container roof 27, or a detent abutment, as depicted in FIG. 1D. Cables (detailed in FIGS. 8A and 8B) are attached between the roof 27 and forward end pivot 36, so that, by further pull on cables 18, a moment about end 38 is generated, which tends to lift pivot 36 upwards, rotating the frame 21 about the end 38. A fully collapsed and retracted position for support frame 21 is indicated by broken line 21'. Any vehicles or general cargo 29 at the front of the container 11 can readily be discharged, by passing underneath the collapse nested frame 21'.

As shown in FIG. 2A, articulated link 25- or more precisely split interconnected link portions 25, 25'—is mounted upon an offset pivot 51 at the roof 27, with an intermediate pivot 26 between link portions 25, 25' and a lower pivot 36 to support frame 21. The mixed vehicle and general cargo capability of FIG. 1D allows great flexibility of container use. Typically, cargo 29 is of a height able to pass through an end access doorway of container 10 and so is restricted to a height somewhat less than that between floor 17 and end rail 202. A shallow roof head or 'dead' space 204 is thus available over the internal load footprint, say for non-cargo purposes.

Reverting to FIG. 1B, (un)loading ramp 15 has been moved to a transit position 15', for shipment within the container 10, with its end doors 23 closed. In practice, ramp 15 desirably comprises lightweight aluminium sections, which can be manhandled and slid inside the container 10, upon the container floor 17, underneath loaded vehicles 32, 34. For ramp carriage along with the nested frames 21, 22 the ramp 15 can be lifted to an intermediate position 15", once vehicles 31, 33 are removed. With frames 21, 22 raised to their collapsed nested position, ramp 15 is carried up into the roof space 205. Various attachment points between the ramp 15 and the frames 21, 22 are envisaged, but a suitable connection point is adjacent to pivots 36, 37, or the ramp 15 could be placed on top of frames 21, 22.

Once a vehicle (say 31) is raised up, fully or partially, its wheels and undercarriage are fairly accessible. Thus, with a vehicle 31 elevated, operatives can work underneath, to secure the wheels and/or other vehicle body parts to frame 22, with lashings 35. Once a vehicle 31 is raised to its full height, close up under roof 27 and roof panel 201, another vehicle 32 can drive in, clear of any structure on either side. There is then room for an operator (not shown) to climb out of vehicle 32, through a door (not shown), and tie the vehicle 32 with lashings or ties 35 to hoops, typically located on container side walls.

In FIG. 2A, the combined centre of gravity of a vehicle 33 and frame 21 is denoted by point 'C'. This represents a relative load distribution or balance point, for fore and aft suspension elements. Cable 18 tension to lift (tilt) a part-suspended weight is significantly less than for a direct upward lift. Attendant power requirements are significantly reduced, since only part of a vehicle and part of a lifting frame need be raised at a time.

FIG. 2A shows a part cut-away perspective view of the forward part of an example of vehicle support frame installation 21 in FIGS. 1A through 1D. A similar arrangement may be used for the other (forward) vehicle support assembly 22. Two parallel (longitudinal) ramps 41, 42 are disposed to support vehicle wheels (not shown). Ramps 41, 42 are carried at one common (forward) end, upon a transverse pivot bar 37. The bar 37 is braced transversely and longitudinally, by location between corrugations 67 of container side wall panels, as detailed in FIG. 2B. One ramp 42 is depicted with a solid platform infill, whilst the other ramp 41 retains an open lattice, (adjustable) rung 48 ladder frame profile. A ladder frame ramp configuration 41, may be fitted with adjustable rungs 48, so that parked vehicle wheels would nest in between. Rung adjustment can be by their relocation in adjacent holes in side frame, to accommodate different length vehicles and wheel sizes. Intermediate rungs 48 might not be needed, since a vehicle could roll upon the container floor 17, when travelling over the frame 22. Wheels nested between rungs 48, when lifted by frame 22, might be arranged to project below frame 22, thereby helping to cushion accidental impact by a vehicle below.

A ladder frame ramp configuration 41, may be fitted with adjustable rungs 48, so that parked vehicle wheels would nest in between. Rung adjustment can be by their relocation in adjacent holes in side frame, to accommodate different length vehicles and wheel sizes. Intermediate rungs 48 might not be needed, since a vehicle could roll upon the container floor 17, when travelling over the frame 22. Wheels nested between rungs 48, when lifted by frame 22, might be arranged to project below frame 22, thereby helping to cushion accidental impact by a vehicle below. A manual, or optionally motorised, or power assisted, winch 46 and cable suspension 19 carries a common one (rearward) end of the paired ramps 41, 42. The lower ends of suspension cables 18 are attached to the frame 22 by respective winches 46. The upper cable 18 ends are anchored to (say welded) fixtures 52 upon top side rails 28 of roof 27. Cables 18 are inclined to the vertical 'V', in either or both transverse and longitudinal planes. Thus cable 18 tension to frame 22, in a transport position, contributes to bracing, against lateral swaying and braking/acceleration motion loads.

A coupling shaft 45 between winches 46 is driven by a rotary handle 49, through a reduction and transfer gearbox 47, to (un)wind cables 18. In practice, cables 18 may comprise robust steel wire or chain, or even (nylon or polypropylene) rope. Handle 49 might be replaced by a drive coupling, for a motor, such as a portable electric hand drill chuck. Alternatively, winches 46 might be motorised with built-in electric motors, supplied by an external power source, or an on-board battery pack. At the opposite and forward end to the suspension cables 19, the ramps 41, 42 of the forward support frame 22, are pivotally mounted, about shaft 37, to articulated links 25, 25'. Link 25 is in turn mounted upon an offset pivot head fixture 51, upon top side rail 28. Thus, minimal preparatory work is required to adapt or convert an otherwise standard container 10 for vehicle carriage. Essentially, installation of support frames 21, 22 involves fitment of fixtures 51 and 52. Suitable fixtures 52 are typically already fitted internally in standard containers.

At the outboard ends of pivot shaft 37 are paired opposed laterally projecting buffers 65. FIG. 2B shows buffer 65 snugly interfitting a side wall corrugation 67, at or near floor 17. Ideally, the buffers 65 are mounted concentrically with the pivot 37 shaft centre line, so that, as the frame 22, or rather ramps 41, 42, swing about pivot shaft 37, the buffers 65 need not be relocated relative to side wall corrugations 67. The buffer 65 itself comprises a flexible, or resiliently deformable, material, such as hard rubber. The outboard end of buffer 65 is of complementary trapezoidal profile to the side wall corrugation. The buffer 65 is mounted upon a shaft 69, carried in a block 68, fitted to frame 22, outboard of the link 25'. The buffer 35 can rotate freely upon the end of its mounting shaft 69. The shaft 69 has a screw thread at 66 and an inboard mounting block 78 has a complementary threaded bore 64. When shaft 69 is rotated, using handle 61, the buffer 65 is either displaced outward to pressed against side wall corrugation 67, or withdrawn therefrom. At the other side of the frame 22 is another opposed action buffer 65. Any lateral misalignment or longitudinal offset between wall panel corrugations at opposite sides could be accommodated by, say, an offset floating pivot head mounting for buffers 65 and/or buffer head (re-) profiling. Similarly, buffers 65 could be profiled to fit side posts 72, as shown in FIG. 2D. Operationally, the buffers 65 would not be tightened to the walls 67 until frame 22 had to be settled into its transport position. Thus, when both buffers 65 are displaced outward, against respective adjacent side wall corrugations 67, the vehicle support frame 22 is restrained, both transversely and longitudinally, by virtue of the step or offset in the corrugation profile.

The inclined or sloping trapezoidal face of the face step transition between inner and outer wall corrugation faces affords a tapering guide for a complementary profile buffer 65 nose. This promotes a progressive location guidance and tightening action. A lower depending link portion 25' has a through hole 63 for shaft 69. Thus, although buffers 65 may be clamped firmly between corrugations 67, vehicle support frame 22 hangs freely upon link portions 25'. Thus frame 22 can still pivot, about buffer shaft 69 and/or pivot shaft 37, to accommodate frame 22 tilt or inclination.

Pivot shaft 37 is shown hollow (at one end), to accommodate clamp shaft 69. Alternatively, pivot shaft 37 could run through a hollow clamp shaft 69. Thus through hole 63 in link 25' could carry shaft 37 and/or shaft 69, with, say, a bearing taken from whichever is the larger local diameter. Similar buffer clamps can be fitted to the otherwise free end 39 of frame 22, or elsewhere, for additional clamping effect between either or both frames 21, 22 and container 10. By varying the projection of the clamps, from one side to another, a vehicle and attendant support frame 22 can be located to one or other side of the container 10. This can be used to advantage, by maximising lateral clearance between one side of vehicle and a container wall, for operator access to and from vehicle doors, without damage. Clamps might also be deployed to reduce vehicle to side wall clearance, so inhibiting unauthorised vehicle access through an unlocked door.

In FIG. 2A, lower depending link portion 25' is shown fitted with a downward bracing strut or leg 43, to engage the container floor 17. The leg 43 also carries a profiled latching detent or cam 44, extending above pivot 37. When drawn up to the stowage position, against roof 27, the cam 44 bears upon the roof 27 and draws leg 43 up generally horizontally, away from cargo. It is envisaged that the links 25, 25' are semi-rigid and of fixed or adjustable span, such as with turn-buckles 62 (not detailed). Such link adjustment would allow pivot shaft 37 to be raised or lowered, to reflect vehicle size or form, or general cargo profile to be accommodated above or below. FIG. 2C shows inset of (slender depth) side posts of an outer carrier frame, such as for the assembly of FIG. 2A, within side wall corrugations. Overall, a variety of different vehicle support configurations are envisaged.

FIGS. 3A and 3B show a variant vehicle support frame 82 mounting upon side posts 81 in conjunction with a cable suspension 85, and a depending leg or bracing strut 84, deployable to bear upon the container floor 17. Each side of vehicle support frame 82—which again may be configured as pair wheel ramps—is carried at one (rearward) end upon a side post 81, through a pivot mounting 87. The post 81 is secured at its upper end by a pivot 83 in a mounting block 89 secured to an upper side frame of a container. The arrangement is suitable for a curtain sided container, in which case the mounting block 89 can be configured as a traveller in an upper (curtain) guide rail, allowing overall longitudinal positional adjustment of the post 81.

FIG. 3B shows a part collapse folded configuration of the support frame arrangement of FIG. 3A. By draw pull on cable 85, or supplementary cables post 81 is swung upwards, about pivot 83. Support frame 82 is carried aloft, to a progressively more horizontal disposition, and bracing strut 84 is swung into alignment with juxtaposed frame 82 and post 81, for a compact overall collapse folded configuration adjacent the container roof underside. The lower end of the post 81 could also be detachably mounted upon a lower curtain side rail guide, to relieve tension suspension loads. Similarly, when the bracing strut 84 is engaged with the container floor, the tension in suspension cable 85 is relieved somewhat, or totally.

Reverting to FIG. 2A, frame 22 might be extended, (in this case forwardly) beyond pivot 37, to allow vehicle end wheel travel beyond that point. Thus the center of gravity of a vehicle driven upon frame 22, with end wheels beyond pivot 37, will be closer to the pivot line 'P'. This achieves a more balanced 'see-saw' effect, about pivot 37—reducing the suspension load in cables 19 to raise the frame 22 and vehicle 31. Indeed links 24, 25' could be replaced altogether by cables, operable for independent (free suspended) variation of frame inclination and elevation. With a fully extendible cable suspension at both ends, frames 21, 22 could be lowered flat upon the container floor 17, so that vehicles can drive on in a horizontal plane. This is safer than progress along an inclined ramp.

FIGS. 8A and 8B show a double-ended cable support arrangement for a support frame 21, 22. Longitudinally spaced cable pairs 162, 164 and 166, 168 are disposed to suspend different (in this case forward and rearward) ends of an underlying vehicle support frame (not shown). Cables 162, 164 run over paired (upright) pulleys 177 and their upper ends are captured in a common traveller block 178 at one container side. Cable 162 is brought across to the same side as cable 164 over paired horizontal transfer pulleys 175. Traveller block 178 is threaded and carried upon a threaded stem 163, with a coupling eye 167, for a loop end 173 of a detachable handle 171. Block 178 is prevented from rotation, as stem 163 rotates, by a rail 112, along which it slides fixed to the top rail 28. Stem 163 is mounted in a bearing block 111, secured to side rail 28 and is fitted with a collar 112. As tension in cables 162, 164, 166 and 168 develops, stem 163 is pulled by block 178 and is balanced by collar 112 acting upon block 111. In the arrangement shown, handle 173 can selectively operate either stem 161, 163 from the rearward end of the assembly. Rotation of the stem 163 by the handle 171 moves the traveller block 178 longitudinally, fore or aft, along the stem 163 and draws (lower ends of cables 162, 164 upward or downward, together. A similar arrangement for the other cable pair 166, 168, brings them over upright pulleys 174 and unites them at traveller block 179 running upon threaded stem 161, at the opposite side to traveller block 178. Cable 168 is brought to the same side as cable 166 by horizontal transfer pulleys 172. The same handle 171, once engaged with coupling eye 165, may be used to rotate stem 161, for traveller block 179 and cable 166, 168 end adjustment. This arrangement allows independent adjustment of cable pairs 162, 164 and 166, 168, for associated vehicle support frame ends—and thus frame tilt and elevation adjustment. The thread pitch of stems 161, 163 allows some mechanical advantage, which may be enhanced with appropriate 'block and tackle' co-operative pulley sets in the cable runs—so manual operator adjustment is feasible, even with a frame loaded with a vehicle.

Figure 3C:
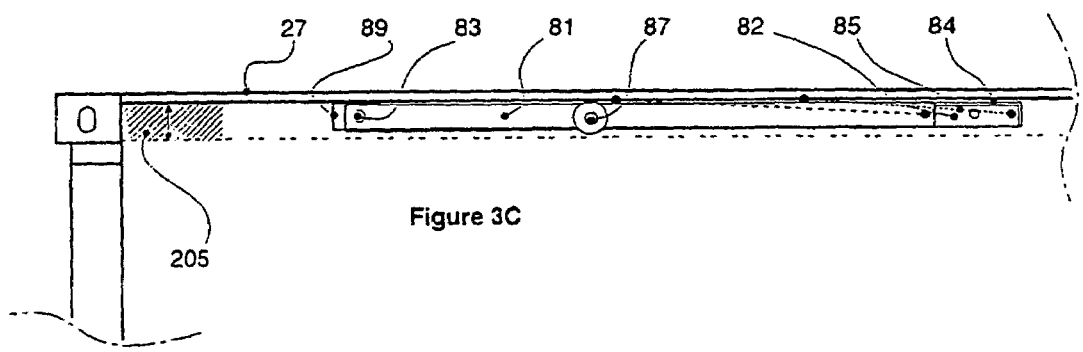

FIGS. 1A through 1D show a vehicle support frame arrangement carried directly by the container (frame)—in particular suspension loads from the roof 27. FIG. 1D includes a detail of an internal headspace 205, generally of depth equivalent to that of a container top end frame rail, and any header bar, and extending over the internal load platform footprint FIG. 3C shows utilisation of this headspace 205 to accommodate a collapse folded, retracted vehicle support frame.

FIG. 2A shows loading of top rails 28, through fixtures 51, 52—which themselves could be secured to standard internal lashing eyes or loops. FIG. 2C shows a supplementary internal frame 70, to carry vehicle support frame loads.

The frame 70 comprises paired upright side posts 72, with a cross header rail 71 and (lug) fixtures 73 to receive cables 18, 19 or links 24, 25. Posts 72 are located within opposed side wall corrugation 67 profiles, for minimal (lateral) load space intrusion; clear of cars, cargo and personnel. The feet of posts 72 can be located by spigot plates 75 plugged into gaps 56 between container floor 17 and bottom side rails 57. The cross rail 71 might be omitted, given a suitable lashing point on the container top rail 28. Posts 72 might be secured to container side walls 67. Within posts 72 could be accommodated a lift, such as a threaded stem 113, anchored at its top in a bearing block (not shown) to allow it to rotate.

Threaded upon stem 113 is a shoe 114 from which hang cables 115 to lift frame 22. Rotation of stem 113 raises and lowers frame 22 via cables 115, which allowing a certain (longitudinal) displacement. Container frame loading can be (re-) distributed by depending extension legs 43 on frame 22. Legs 43 could be adjustable in span, to reach the container floor 17, and could slide transversely within block 65. This would not only minimise their intrusion in to the container cargo space, but to allow a shift into side wall corrugations to assist in securing frames 21, 22. Generally, support frames 21, 22 might be collapsible, or demountable, for ease of transport and storage when not needed. Releasable fastenings or couplings (not shown) could be fitted between support frames 21, 22 and container frame, even using existing internal load lashing points. Although various vehicle support frame mountings have been described, they may be combined beyond the particular arrangements depicted.

FIGS. 1A through 1D are compatible with diverse container types, but are particularly addressed to solid panel side walls. However, they could be adapted to work with an open lattice container frame structure—that is without necessarily reliance upon intervening wall or end panel infill. Similarly, the lateral locking clamps of FIGS. 2A and 2B are intended to work in conjunction with solid side wall containers, and in particular corrugated sides.

Curtain Sided Container

FIGS. 3A–3B and 4A–4B are compatible with open—and in particular curtain—sided containers and trailers, in not relying upon side wall clamping.

FIGS. 5A–5C, 6, 7A–7D and 9 are compatible with corrugated solid side walls to accommodate side posts or with curtain sides. Generally, vehicle support frames could be clamped between opposed side posts, themselves secured between container upper and lower side rails.

FIGS. 2A, 3A and 3B feature a strut or post spanning between container roof 27 and floor 17. This allows load distribution to be adjusted—although a predominant hanging or suspension loading, and thus strut tension, may be retained.

The FIGS. 3A, 3B side posts 81 are configured to fit an open (curtain) side wall, using existing upper and lower side rail guides. The post end fittings can thus be fitted with runners, to locate in those guide rails, allowing longitudinal post adjustment. A roller runner connection can also be employed between vehicle support frame and side post, to accommodate longitudinal pivot positional adjustment as the frame changes its elevation. By uncoupling the lower post end from the lower guide rail, the post can be pivoted, about its upper end carrier or rail runner—to a retracted position adjacent the container roof 27. Similarly, longitudinal post tilt or inclination can be accommodated by relative movement of post top and bottom runners—with optional post (say telescopic) extendibility, for longer diagonal span.

FIG. 4A shows an open (curtain) sided container, with (flexible fabric sliding side wall) curtain 105, running in a guide track 103 fitted under an upper side rail 98, supporting a roof panel 201. A depending, resiliently deformable, or semi-rigid, side seal 109 is fitted between upper side rail 98 and curtain 105 as a weather barrier. A supplementary side post guide track 101 is fitted, inboard of the curtain guide track 103, beneath the upper side rail 98, to carry a longitudinally movable side post 95. The side post 95 supports a part-balanced, (vehicle support frame) ramp 92 through a pivot mounting 96. In conjunction with the post 95, a (rearward) cable suspension 91 and (forward) articulated link 94 act at opposite sides of the pivot 96. By virtue of the guide track 101 and pivot runner 102 top mounting, post 95 can be moved wholesale, or canted longitudinally, to adjust pivot 96 disposition—and thus ramp 92 tilt and/or elevation. Similarly, some mobility of pivot 96 upon post 95 could be achieved with, say, a sliding mounting. A corresponding bottom mounting 104 (not detailed) could be provided for the post 95, say using a lower guide track.

FIGS. 5A through 5C and 6 depict vehicle support frame variants which may be adapted for (rigid) panel sided, or (soft) curtain sided containers, using longitudinally spaced support post pairs. Thus FIG. 5A shows a container side wall 127 that could be rigid panel corrugations or a sliding (e.g. concertina folding) curtain. Adjustable side posts 125 feature at both rearward and forward ends of (vehicle support) ramps 122.

FIG. 5B details accommodation in hollow side posts 125 of screw jacking pillars 121. A traveller 128, with an inward spigot 126, runs upon a screw pillar 121, for pivot mounting ramp 122, allowing tilt and elevation. Side posts 125 span between upper and lower container side rails, with an upper mounting 129 and lower mounting 124. End mountings 124, 129 may be adjustable, for side post 125 pivot and/or movement longitudinally, to accommodate ramp 122 disposition. Similarly, an intermediate roller slide, mounting 126 between side posts 125 and ramps 122 accommodates ramp 122 (re-)orientation (tilting) and (re-)disposition (elevation). Side posts 125 may be suspended from respective upper mountings 129 and can feature a motorised pivot, for post 125 retraction folding. Generally, either or both forward and rearward side post pairs 125 could be moved longitudinally, together or differentially, for ramp 122 orientation. FIG. 5C shows an articulated or swing link 132 and free cable suspension 131 for local interconnection of ramp 122 and screw jack pillar runner 128.

FIG. 6 shows ramps substituted by transverse wheel carriages 134, 136 of open lattice form, allowing wheel capture between rungs. This arrangement allows independent movement of front or rear wheel pairs. As the wheel support plane between carriages 134, 136 tilts, vehicle body disposition can adjust about the captured wheels. That said, the carriages 134, 136 could themselves tilt about respective transverse axes, that is about spigot mountings 126, to accommodate vehicle tilt. Once the carriages 134, 136 have stabilised, they could be secured to their respective suspension elements (whether cables or screw jack pillars) by a bracing and clamping arrangement, such as shown in FIGS. 7G and 7H. Again longitudinal post travel in upper and lower guide rails could also accommodate differential vehicle span.

FIGS. 7A through 7D show other suspended wheel carriage or cradle configurations. FIG. 7A shows wheel carriages 144, 146 between upper links 141, 143 and lower struts 148, 149, to share loads between container roof 27 and floor 17. Struts 148, 149 are either fixed or adjustable (e.g. telescopic) span, generally upright, single pillars. FIG. 7B shows wheel carriage underside support by adjustable crossed-leg, or scissor-jacks 151, 153. FIG. 7C shows wheel carriage underside support by trestles 155, 157, with fixed or adjustable splay longitudinal bracing legs. FIG. 7D shows wheel carriage underside support by a combination adjustable single and multiple splayed extension leg trestles 158, 159. FIGS. 7A and 7B use primary suspension cables and/or depending links 141, 143, with diagonal cross-bracing wires 145, 147, for longitudinal stability. FIGS. 7C and 7D rely upon underlying trestle bracing longitudinally.

The adjustable cable suspension of FIGS. 8A and 8B can be used in conjunction with the arrangements of FIGS. 7A through 7C. FIGS. 7E through 7H show wheel suspension cradle refinements, including local tyre protrusion as a buffer, vehicle re-orientation about a suspended wheel pivot, cradle to suspension cable bracing upstand 154 and releasable cable clamp 154. The upstand 154 and clamp 154 inhibit cradle swing upon the suspension cables. An inverted parking position for cradle 146 is shown in outline, allowing it to be retracted into the container internal roof headspace 205 (FIG. 1D). Cable suspension could be substituted with suspended screw jacking pillars, again hung from the container roof frame structure. The vehicle support assembly could be removable and (re-)installable in its entirety. Thus the vehicle support assembly could be configured as a demountable (overhead) gantry or crane structure, secured to excising internal container frame lashing points, by detachable fastenings or ties (not shown)

FIG. 9 shows the vehicle support assembly configured within a container extension module 230, (de-)mountable upon an open top container 210. A similar configuration could be employed for, say, a flat rack container, as a gantry between end walls upstanding upon a base platform (not shown). Mounting is through standard corner block mounting blocks 212, 214 and internal couplings, such as Twistlocks, for overall container handling and stacking, as an integrated unitary entity. Extension module 230 carries vehicle support frames 221, 222, with associated cable suspensions 218, 219 and articulated links 224, 225. Vehicles 231, 233 are carried at an upper level upon support frames 221, 222. This generally reflects the arrangements of FIGS. 1A through 1D, so will not be described further. The collapse folded mode of the frames 221, 222 is within the depth confines of the extension module 230, affording protection. The module 230 could then be uncoupled from the underlying open top container 210 and used with another container or stored. A peripheral seal (not shown) may be installed between extension module 230 and underlying open top container 210.

What is claimed is:

1. A motor vehicle and general cargo load support system mountable in a transportation container serving both transportation and storage purposes, said system comprising:

at least one frame adapted to receive thereon a first motor vehicle;

a first pair of spaced apart flexible frame support linkages mounted at a forward portion of said frame and extending to spaced apart first attachment points in a first upper portion of said transportation container;

means serving to pivotally connect said frame support linkages at their lower ends to said frame and at their upper ends to said container first attachment points, said means at the lower ends of said flexible linkage being readily dismountable from the frame in a first selected loading condition of the transportation container so as to accommodate general cargo loads;

a second pair of spaced apart frame support linkages coupled to a rearward portion of said frame and extending to spaced apart second attachment points in a second upper portion of said transportation container;

raising and lowering means coupled to each said first and second frame support linkages and the upper portion of said transportation container serving to permit raising and lowering said rearward portion of said frame independently of said forward portion of said frame so that the frame together with the motor vehicle supported thereon may be shifted from a downwardly inclined condition for vehicle loading and unloading to an upwardly inclined condition for transport and storage and affording space there beneath the frame and vehicle in the container for a second motor vehicle and general cargo in a second selected loading condition; and means acting with said raising and lowering means and said first frame linkage serving to permit said first frame support linkage to shorten in said first selected loading condition, to raise the front portion of the frame to the container upper portion and to raise the rearward portion of the frame to said upper portion flexibly affording unobstructed space in the container for the general cargo.

2. The motor vehicle and general cargo load support system of claim 1, and further including a second frame adapted to receive thereon a third motor vehicle and including said mentioned first and second frame support linkages operative to permit transportation and storage of said second motor vehicle in an upwardly inclined condition in said storage container in said second loading condition, the container being configured for said first and third motor vehicles supported in an inclined condition and said second motor vehicle and a fourth motor vehicle there below in a horizontal condition thus affording nested stacking of a plurality of motor vehicle within the cargo container.

3. The motor vehicle and general cargo load support system of claim 2 wherein said flexible frame support linkages comprise suspension cables and wherein said raising and lowering means are configured for independent frame tilt and frame elevation to allow compact load packing and nested inter-fit of vehicles within the container.

* * * * *